United States Patent [19]

[11] 3,733,471

Gilberg

[45] May 15, 1973

[54] RECIRCULATING COUNTER

[75] Inventor: Robert C. Gilberg, Dayton, Ohio

[73] Assignee: The National Cash Register Company, Dayton, Ohio

[22] Filed: Dec. 7, 1971

[21] Appl. No.: 205,546

[52] U.S. Cl.........235/92 NG, 235/92 SH, 235/92 PE, 235/92 R, 340/173 RC, 340/174 SR, 328/37

[51] Int. Cl..........................H03k 21/36, H03k 23/02

[58] Field of Search.......................235/92 ST, 92 PE, 235/92 PL, 92 NG; 328/37; 307/221; 340/173 RC, 174 SR

[56] References Cited

UNITED STATES PATENTS

| | | | |
|---|---|---|---|
| 3,581,068 | 5/1971 | Wyatt | 235/92 PL |
| 3,535,698 | 10/1970 | Martin | 340/173 RC |
| 2,964,735 | 12/1960 | Abbott | 235/92 SH |
| 3,077,581 | 2/1963 | Grady | 340/173 RC |
| 3,239,764 | 3/1966 | Yerma et al. | 235/92 SH |

*Primary Examiner*—Thomas A. Robinson
*Assistant Examiner*—Joseph M. Thesz, Jr.
*Attorney*—J. T. Cavender

[57] ABSTRACT

A four phase MOS-LSI dynamic recirculating binary counter which operates in an N bit time cycle and which counts in excess of $2^N-1$ counts is disclosed. The counter includes an N stage shift register counter and output logic. The output logic includes a latch which is set once each time cycle during a given bit time and reset by the first logic 0 signal from the shift register counter. If during the given bit time of the next cycle the latch is still set and the least significant shift register stage signal is logic 1, a signal is provided to set additional latch circuits which act as additional stages of the binary counter.

7 Claims, 9 Drawing Figures

RECIRCULATING COUNTER

This invention relates to counting apparatus and more particularly to a dynamic recirculating counter for operation in an N bit time cycle where the counter can count to a value above $2^N-1$.

A dynamic recirculating counter operating in an N bit time cycle has N bistable stages in which information in any stage, except the first, is shifted to the next lower stage each bit time and information in the first stage is shifted to the Nth stage each bit time. The Nth stage includes logic circuitry which allows the output thereof to vary from the input in such a manner that the count of the counter is incremented once each time cycle.

This type of counter is limited to having a count between zero and $2^N-1$. However, in many applications it is desirous to have a counter capable of having a count greater than $2^N-1$.

In accordance with one preferred embodiment of this invention, there is provided an N+1 stage binary counter which includes an N stage binary counter, decoding means responsive to the binary count of the N stage binary counter for providing a signal whenever a full count exists in the N stage binary counter, and bistable means for being set in response to said decoding means signal.

A detailed description of one preferred embodiment of this invention is hereinafter given with reference being made to the following FIGURES, in which.

Figure 1:
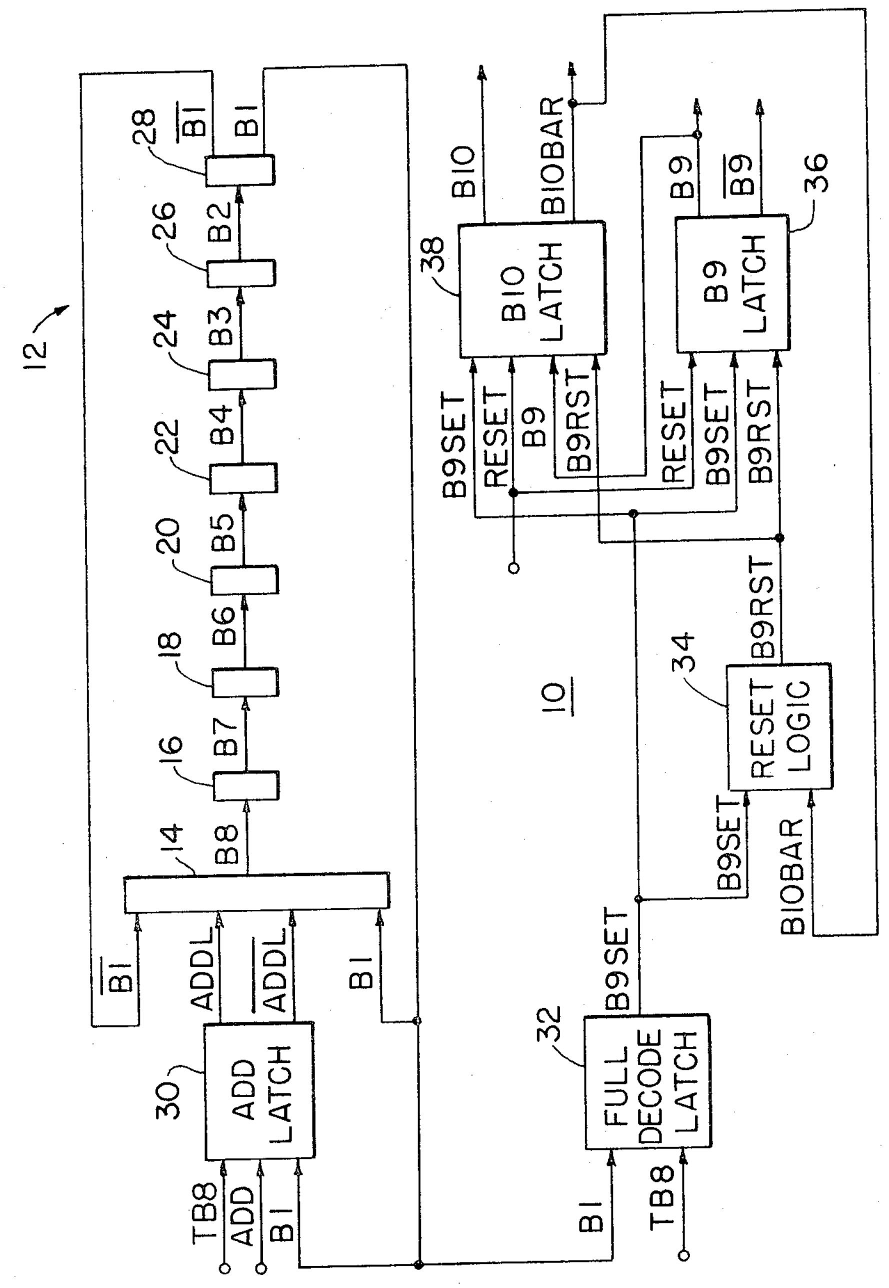
FIG. 1 shows a block diagram of a counter operating in an eight bit timing system which can count to a value of 1023.
Figure 2:
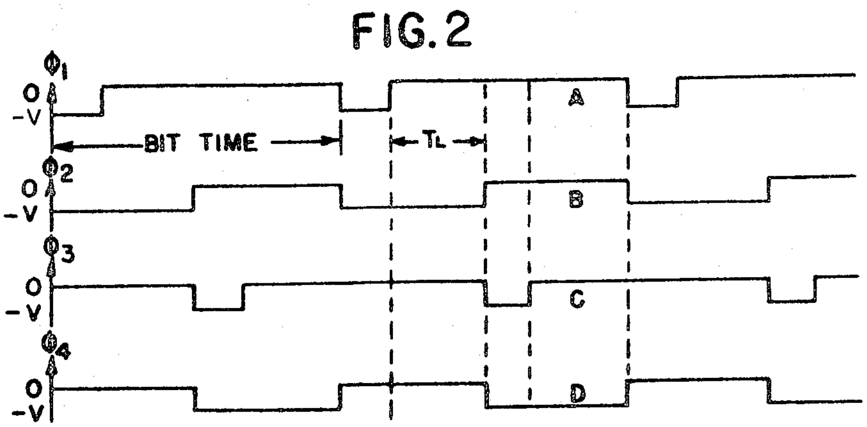
FIG. 2 shows the four phase clock signals used in operating the logic circuits of the present invention.

FIG. 1 shows a block diagram of the counter means 10 of this invention. However before one can fully understand the block diagram shown in FIG. 1, a general understanding of four-phase metal-oxide semiconductor (MOS) logic circuitry is necessary, since FIG. 1 consists of blocks of logic for which equations and operation, but not detailed circuitry, are given. The following description concerning FIGS. 2 through 9 will explain clocking and the circuits which may be constructed in response to the given logical equations.

Counter 10 operates on an eight-bit periodic cycle, and eight separate and repetitive timing signals TB1 through TB8 are produced. Each of the timing signals is cyclically logic 1 for a one-bit time duration and logic 0 otherwise. These bit times are respectively designated as times TB1 through TB8. In addition, there are eight timing signals $\overline{TB1}$ through $\overline{TB8}$, which are the respective complements of the TB1 through TB8 signals and hence are logic 0 during respective times TB1 through TB8 and logic 1 otherwise. In addition to the sixteen timing signals TB1 through TB8 and $\overline{TB1}$ through $\overline{TB8}$, four phase control signals $0_1$, $0_2$, $0_3$, and $0_4$ are provided, and each of these signals is respectively shown in FIGS. 2A through 2D. Each of the four $0_1$, $0_2$, $0_3$, and $0_4$ signals is a series of periodic pulses, each of which occurs once each bit time. The $0_1$ signal, shown in FIG. 2A, has a relatively short pulse, such as one sixth of a bit time. The $0_2$ signal, shown in FIG. 2B, has a longer pulse, such as one half a bit time. The leading edges of the $0_1$ and $0_2$ signals occur simultaneously. The $0_3$ signal, shown in FIG. 2C, has a short pulse, such as one sixth of a bit time, and has a leading edge coincident with the trailing edge of the $0_2$ signal. The $0_4$ signal, shown in FIG. 2D, has a longer pulse, such as one half of a bit time, and has a leading edge coincident with the leading edge of the $0_3$ signal and a trailing edge coincident with the leading edge of the $0_1$ signal. The term "four-phase" is used to define these signals because the trailing edge of each occurs at four different times. A bit time is defined as the time between leading edges of successive $0_1$ pulses.

Figures 3, 4, 5, 6:
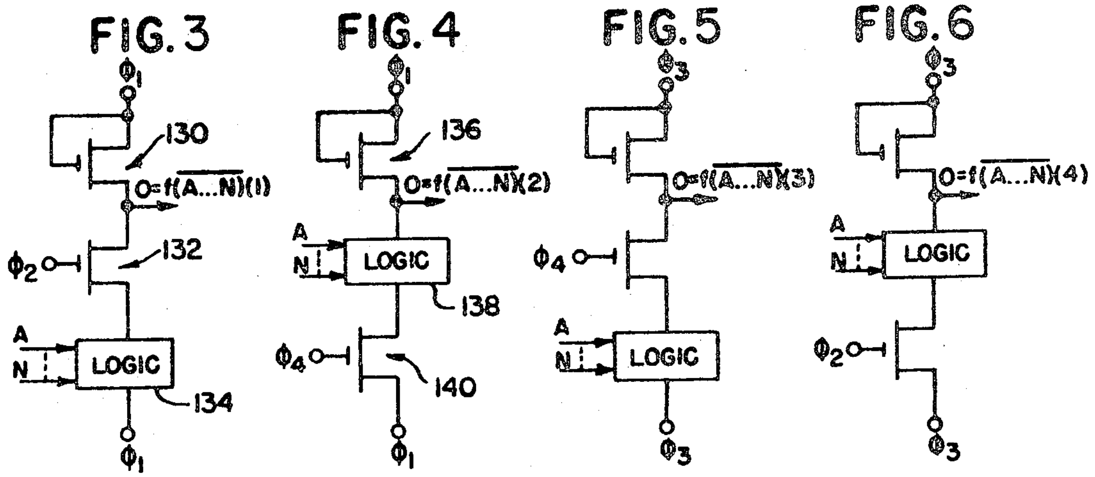
FIGS. 3 through 6 show, respectively, a 1, 2, 3, and 4 gate used as the building block logic elements of the present invention.

FIGS. 3 through 6 show the basic building blocks used in four-phase MOS logic circuitry. These building blocks are respectively called 1, 2, 3, or 4 gates and are respectively shown in FIG. 3, FIG. 4, FIG. 5, and FIG. 6. In FIG. 3, the 1 gate shown includes a first MOS transistor 130, which is designated as a load transistor; a second MOS transistor 132, which is designated an isolation transistor; and a series of one or more MOS transistors connected together to form logic circuit 134. Examples of the form which logic circuit 134 can take will be hereinafter given in more detail. The gate electrode of load transistor 130 is connected to the drain electrode thereof, and both of these are connected to the $0_1$ signal, shown in FIG. 2A. The source electrode of load transistor 130 and the drain electrode of isolation transistor 132 are coupled together, and the output 0 from the 1 gate is taken from this connection. The source electrode of isolation transistor 132 is connected to the drain electrodes of at least some of the transistors in logic circuit 134, and the source electrodes of at least some of the transistors in logic circuit 134 are connected to the $0_1$ signal. The gate electrode of isolation transistor 132 is connected to the $0_2$ signal, and the gate electrodes of the transistors in logic circuit 134 are connected to the input signals A through N. A general statement concerning the configuration of logic circuit 134 would be that, wherever two signals are to have a logical AND performed therebetween, the transistors to which those signals are applied will be connected in series, and, wherever two signals are to have a logical OR performed therebetween, the transistors to which those signals are applied will be connected in parallel. The output signal 0 from a 1 gate can be written as a function of the various input signals inverted, as indicated by the line drawn over the function. For instance, if B is "true", "on", or logic "1", $\overline{B}$ is "flase", "off", or logic 0. Set off to the side of this equation would be the term (1), indicating a 1 gate. Herein, the term logic 1 will be used to signify a negative voltage signal, and the term logic 0 will be used to signify a voltage less than the threshold voltage of an MOS transistor, such as ground potential.

The operation of the 1 gate shown in FIG. 3 is hereinafter described with the assumptions being made that (1) the output is coupled to the gate electrode of another MOS transistor (not shown), which acts as a capacitive load, and (2) logic circuit 134 consists of a single transistor, hereinafter called the logic transistor, having its source connected to the $0_1$ signal and its drain connected to the source electrode of isolation transistor 132. The input to the gate electrode of the logic transistor will be the input voltage A, which is first assumed to be negative (logic 1) during the time the $0_2$ signal is negative. During the time that the $0_1$ signal is negative, the $0_2$ signal also will be negative, as seen from FIGS. 2A and 2B, and, thus, both load transistor 130 and isolation transistor 132 will be conductive. Since load transistor 130 is conductive the voltage at the output 0 will be negative, and this will cause the capacitive load (not shown) to become negatively charged. After the $0_1$ signal returns to ground voltage, but before the time the $0_2$ signal returns to ground voltage, as seen during the time $T_L$ between FIGS. 2A and 2B, load transistor 130 will become nonconductive and exhibit an extremely high drain-to-source impedance, while isolation transistor 132 will remain conductive and exhibit a relatively low drain-to-source impedance. In this event, one must look to the state of conductivity of the transistor in logic circuit 134. Since it was assumed that the input voltage A was negative, the logic transistor will be conductive; hence the output signal will be at ground voltage (logic 0), since the drain electrode of the conductive logic transistor is connected to the $0_1$ signal, which is now at ground voltage. If the input voltage A was at ground potential (logic 0), the logic transistor would be nonconductive; hence the output voltage 0 would remain as the negative voltage (logic 1) stored in the capacitive load (not shown). Thus, the 1 gate just described acts as an inverter circuit; that is, the output signal, 0, is equal to the opposite of the input signal A. Written as a logical equation, this becomes $$0=\overline{A}$$

where the (1) term signifies a 1 gate.

Referring now to FIG. 4, a 2 gate is shown. The 2 gate similarly has a load transistor 136 having its drain and gate electrodes connected together and to the $0_1$ signal. The output from a 2 gate is taken from the source electrode of load transistor 136, which is also connected to the drain electrodes of at least some of the transistors in a logic circuit 138, which may be similar in construction to logic circuit 134. The source electrodes of at least some of the transistors in logic circuit 138 are connected to the drain electrode of an isolation transistor 140, which has its source electrode connected to the $0_1$ signal and its gate electrode connected to the $0_4$ signal. To understand the operation of a 2 gate, assume that (1) the output 0 is connected to a capacitive load and (2) there is a single logic transistor in logic circuit 138 having its gate electrode connected to the input voltage A, its drain electrode connected to the output signal 0, and its source electrode connected to the drain electrode of isolation transistor 140. During the time the $0_1$ signal is negative, load transistor 136 will be conductive, and a negative signal will become stored in the capacitive load, thereby making the output signal 0 a negative voltage. When the $0_1$ signal returns to ground level, there will be no immediate path through which the capacitive load can discharge to ground, even though the logic transistor may be conductive. If the input signal A had been at ground potential, the logic transistor would be nonconductive, so the output signal 0 will remain at the negative voltage stored in the capacitive load. However, if the input signal is a negative voltage, the logic transistor is conductive, and, during the time the $0_4$ pulse is negative, isolation transistor 140 is conductive. Therefore, during the $0_4$ negative voltage time, the capacitive load can discharge to ground ($0_1$ is at ground potential when $0_4$ is negative) through the logic transistor and isolation transistor 140. Then, after $0_4$ returns to ground, but before $0_3$ returns to ground, the output signal O will be at ground potential. Thus, the 2 gate acts as an inverter circuit in this case. The logical equation for a 2 gate is:

$$0=\overline{A} \qquad (2)$$

where the term (2) indicates a 2 gate.

Referring now to FIG. 5, there is shown a 3 gate, which is identical to the 1 gate shown in FIG. 3, with the exception that the $0_3$ and $0_4$ signals are used in place of the respective $0_1$ and $0_2$ signals used in FIG. 3. The output of the 3 gate is also an inverted version of the input applied thereto, where the logic circuit includes only a single transistor. Referring now to FIG. 6, there is shown the final building block in four-phase logic, which is a 4 gate. The 4 gate is identical to the 2 gate shown in FIG. 4 with the exception that the $0_3$ and $0_2$ signals are used in place of the respective $0_1$ and $0_4$ signals used in FIG. 4. The equations for the 3 and 4 gates shown in FIGS. 5 and 6 are, respectively:

$$0=\overline{A} \qquad (3)$$

$$0=\overline{A} \qquad (4)$$

Figure 7:
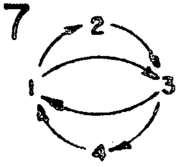
FIG. 7 is a chart showing which gate of FIGS. 2 through 6 can drive which other gate.

Referring now to FIG. 7, there is shown a chart depicting which types of gates may apply signals to and/or receive signals from which other types of gates. The numbers 1, 2, 3, and 4 indicate the respective 1, 2, 3, and 4 gates shown in FIGS. 3 through 6. From the chart in FIG. 7, it is seen that a 1 gate can apply a signal to either a 2 gate or a 3 gate. Similarly, a 2 gate can only apply a signal to a 3 gate. A 3 gate can apply a signal to either a 4 gate or a 1 gate, while a 4 gate can only apply a signal to a 1 gate. It should be noted that 1 and 3 gates delay the data applied there one half of a bit time, while 2 and 4 gates do not.

With the above basic building blocks in mind, two examples of designing logic circuits using four-phase MOS circuits will now be given. In both examples, a 1 gate performs logic and feeds an inverter 3 gate. First, the example will be given for a situation where one desires to provide a negative output signal when either a C input signal is negative or an A input signal and a B input signal are negative; that is, a circuit to perform the logical function A B + C.

Figures 8, 9:
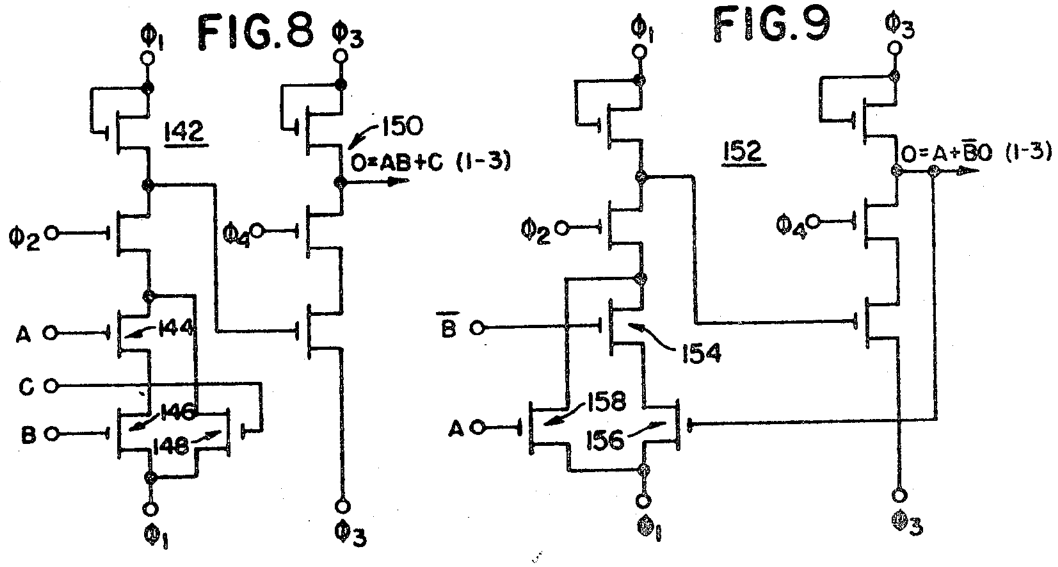
FIGS. 8 and 9 are examples of how logic circuits can be built for given logic equations.

FIG. 8 shows a 1 gate- 3 gate combination circuit 142, which satisfies these requirements where the logic is performed in the 1 gate and the 1 gate output is inverted by the 3 gate to get the required result. Since the signals A and B must be negative at the same time in order to get O as a negative voltage, A and B are in a logical AND relationship; hence logic transistors 144 and 146 are connected in series with the A and B input signals respectively applied thereto, thereby forming an AND gate. Alternatively, output signal O could be negative if the C input signal had been negative. Therefore C is in a logical OR relationship with A and B; hence transistor 148 is connected in parallel with the two serially-connected logic transistors 144 and 146, and input signal C is connected thereto, thereby forming the OR gate. The output from the 1 gate in FIG. 9 can be written as the logical equation $$0 = \overline{(A\ B + C)} \qquad (1)$$

The symbol (1) indicates that the logic given in the equation is performed in a 1 gate. If this output is applied to the input of the logic transistor in the 3 gate inverter 150 in FIG. 8, the output O becomes the equation:

$$0 = A\ B + C \qquad (1\text{–}3)$$

The notation (1–3) used here indicates that the input signals are applied to a 1 gate and the output signal is taken from a 3 gate, with the output of the 1 gate being applied as the input of the 3 gate. There is also a one-bit time delay between the application of the A, B, and C signals and the provision of the O signal. The circuit 142 of FIG. 8 could be one stage of a shift register, where, for instance, A comes from the previous stage of the register and where B and C are other inputs which can affect the register in desired manners.

Another common type of equation used in logical design is the latch equation, which may be written as:

$$0 = A + \overline{B}\ 0$$

Here O becomes negative when A becomes negative, and O remains negative until $\overline{B}$ goes from its normally negative value to ground. FIG. 9 shows a circuit 152, which will perform this logic function. In this case, transistors 154 and 156 are connected in series, transistor 154 having its gate electrode connected to the $\overline{B}$ data signal, and transistor 156 having its gate electrode connected to the output signal O. Transistor 158 is connected in parallel with transistors 154 and 156, and its gate electrode is connected to the A input signal. This circuit operates so that, whenever the A signal goes negative, he output signal O will go negative. This, in turn, will render conductive transistor 156, and, since the normally negative $\overline{B}$ signal is applied to transistor 154, it will be conductive. This will keep the output signal O negative, even though the A signal returns to ground. When the $\overline{B}$ signal goes to ground, transistor 154 will become nonconductive, and the output signal O then goes back to ground. Hence the circuit shown in FIG. 9 operates as a logical latch, or as an R – S flip-flop circuit; it is set by the A signal and reset by the $\overline{B}$ signal.

Referring again to FIG. 1, counter means 10 includes eight stage counter 12 having most significant to least significant stages 14, 16, 18, 20, 22, 24, 26 and 28, which respectively provide the B8, B7, B6, B5, B4, B3, B2 and B1 signals. In addition, least significant stage 28 provides the $\overline{B1}$ signal, which is the complement of the B1 signal. The output signals B8 – B2 of each of the stages 14–26 (even numbers) are applied as the input signal to the next lower stage in significance 16–28 (even numbers). The input signals to most significant stage 14 are the B1 and $\overline{B1}$ signals from stage 28 and the ADDL and $\overline{ADDL}$ from Add Latch 30. The logical equations for eight stage counter 12 are:

| | | |
|---|---|---|
| $B8 = \overline{ADDL}\ B1 + ADDL\ \overline{B1}$ | (1-3) | 12-1 |
| B7 = B8 | (1-3) | 12-2 |
| B6 = B7 | (1-3) | 12-3 |
| B5 = B6 | (1-3) | 12-4 |
| B4 = B5 | (1-3) | 12-5 |
| B3 = B4 | (1-3) | 12-6 |
| B2 = B3 | (1-3) | 12-7 |
| B1 = B2 | (1-3) | 12-8 |
| $\overline{B1} = \overline{(B1)}$ | (4) | 12-9 |

Add Latch 30 provides the ADDL and $\overline{ADDL}$ signals in response to the TB8, ADD and B1 signals according to the logic equations:

$$ADDL = ADD\ TB8 + ADDL\ B1 \quad (1\text{-}3) \quad 30\text{-}1$$

$$\overline{ADDL} = \overline{(ADDL)} \quad (4) \quad 30\text{-}2$$

A logic 1 ADD signal causes counter means 10 to increment its count by one each time cycle and may be provided from means (not shown) external to counter means 10.

Eight stage counter 12 and Add Latch 30 together form a recirculating counter, with the logic values (1 or 0) of the B8 – B1 signals at time TB1 being the count. As long as the ADD signal applied to Add Latch 30 is logic 1, the binary count manifested by the B8 – B1 signals increases by one each time cycle. For example, if the count at a given TB1 time is zero (0-0-0-0-0-0-0-0), the count at the next TB1 time is one (0-0-0-0-0-0-0-1).

The operation of eight stage counter 12 and Add Latch 30 will be explained by showing how the count changes from zero to one, and from one to two. Thus, it will be assumed that each of the B8 - B1 signals are logic 0 at time TB1 when the ADD signal becomes logic 1. Prior to the ADD signal becoming logic 1, ADD Latch 30 is reset and the $\overline{ADDL}$ signal is logic 1. In this case, the B1 signal is applied through stage 14 unaltered according to the $\overline{ADDL}$ B1 term of equation 12–1. When the ADD signal becomes logic 1, the next occurring TB8 timing signal causes Add Latch 30 to become set (eq. 30–1) and the ADDL signal to become logic 1 at time TB1. As long as the ADDL signal is logic 1, the compliment of the B1 signal becomes the B8 signal according to the ADDL $\overline{B1}$ term of equation 12–1. The first logic 0 B1 signal following the setting of Add Latch 30 resets Add Latch 30 thereby causing the $\overline{ADDL}$ signal to become logic 1 again (eq. 30–1). Thus, when the count of eight stage counter 12 is zero, the first B1 signal is logic 0 and causes Add Latch 30 to be reset, thereby causing the ADDL signal to become logic 0 at time TB2. Thus, during time TB2, the B8 signal becomes the same as was the $\overline{B1}$ signal during time TB1. At the following TB1 time, the B1 signal will be a logic 1 and the B8 – B2 signals will be logic 0, so the count in counter 12 is 0-0-0-0-0-0-0-1, or one.

When Add Latch 30 is set again by the TB8 signal causing the ADDL signal to become logic 1 at TB1 time, the B1 signal during time TB1 is logic 1 so Add Latch 30 remains set and the ADDL signal remains logic 1. However, during TB2 time, the B1 signal is logic 0 (this being the B2 signal during TB1 time), so Add Latch 30 is reset causing the ADDL signal to become logic 1 during TB3 time. Thus, during times TB2 and TB3, the B8 signal becomes the same as the $\overline{B1}$ signal was during times TB1 and TB2; that is during time TB2, the B8 signal becomes logic 0 and during time TB3, it becomes logic 1. Thereafter, the B8 signal becomes what the B1 signal had been one bit time earlier. Thus, at the next TB1 time, the count is counter 12 becomes 0-0-0-0-0-0-1-0, or two. This same operation continues so long as the ADD signal remains logic 1.

After the count of counter 12 becomes 255 (1-1-1-1-1-1-1-1), the remaining logic shown by FIG. 1 is sued. This logic includes Full Decode Latch 32, Reset Logic 34, B9 Latch 36 and B10 Latch 38. Full Decode Latch 32 provides the B9SET signal in response to the B1 and TB8 signals according to the logical equation:

| | | |
|---|---|---|
| $DCD256 = \overline{B9SET}\ DCD256\ B1 + TB8$ | (1-3) | 32-1 |
| $B9SET = DCD256\ B1\ TB8$ | (1-3) | 32-2 |
| $B9SET = \overline{(B9SET)}$ | (4) | 32-3 |

Reset Logic 34 provides the B9RST signal in response to the B9SET and B10BAR signals according to the logical equation:

| | | |
|---|---|---|
| $B9RST = \overline{(B10BAR\ B9SET)}$ | (4) | 34-1 |

B9 Latch 36 provides the B9 and $\overline{B9}$ signals in response to the B9SET and B9RST signals and a RESET signal. The RESET signal is a normally logic 1 signal and is applied from the logic (not shown) external to counter means 10. When it becomes logic 0 it resets to the B9 Latch 38 and B10 Latch 38. The logical equations for B9 Latch 36 are:

| | | |
|---|---|---|
| $B9 = B9\ B9RST\ RESET + B9SET\ \overline{B9}$ | (1-3) | 36-1 |
| $\overline{B9} = \overline{(B9)}$ | (4) | 36-2 |

B10 Latch 38 provides the B10 and B10BAR signals in response to the B9SET, B9RST, RESET and B9 signals according to the logical equations:

| | | |
|---|---|---|
| $B10 = \overline{(B10\#1)}$ | (3) | 38-1 |
| $B10BAR = \overline{(B10\#2)}$ | (3) | 38-2 |
| $B10\#1 = B10\ RESET + B9SET\ B9$ | (1) | 38-3 |
| $B10\#2 = \overline{(B10\ 1)}$ | (2) | 38-4 |

Full Decode Latch 32 is set by each TB8 signal (equation 32–1) causing the DCD256 signal to become logic 1 each TB1 time. The first logic 0 B1 signal then resets Full Decode Latch 32 (equation 32–1). Thus, by the following TB8 time, the DCD256 signal will return to logic 0 unless the B7–B1 signals are all logic 1 at time TB1. Only in this case will the DCD256 signal be logic 1 during the TB8 time.

Also, the B8 signal at time TB1 is the B1 signal at time TB8. Thus, if during time TB8, the DCD256 remains at logic 1 and B1 signal is logic 1, the count in counter 12 was full at the previous TB1 time. According to equation 32–2, this causes the B9SET signal to become logic 1 and the $\overline{B9SET}$ signal to become logic 0 during the following TB1 time. The logic 0 $\overline{B9SET}$ signal then resets Full Decode Latch 32 (equation 32–1), if it had not been reset by counter 12 going from a full count of 255 back to zero (this could occur if, for instance, the ADD signal is logic 0 immediately after counter 12 has reached the full count of 255). From the above discussion, it is seen that the B9SET signal will be provided each time counter 12 achieves a full count of 255.

Just prior to the first B9SET signal, both the $\overline{B9}$ and B10BAR signals are logic 1. Thus, the first B9SET signal sets B9 Latch 36 according to the B9SET $\overline{B9}$ term of equation 36–1. This causes the B9 signal to become logic 1 and the $\overline{B9}$ signal to become logic 0. The first B9SET signal also caused the B9RST signal provided by Reset Logic 34 to become logic 0 (eq. 34–1). However, this has no effect on resetting B9 Latch 38 at this time, nor on already reset B10 Latch 38.

The second time counter 12 becomes full, the B9SET signal again becomes logic 1 and causes the B9RST signal to become logic 0 (eq. 34–1). Since the B9 signal is now logic 1, the logic 0 B9 Latch 36 according to the B9 B9RST RESET term of equation 36–1. This causes the B9 signal to become logic 0 and the $\overline{B9}$ signal to become logic 1 one bit time later. The second B9SET signal also sets B10 Latch 38 according to the B9SET B9 term of equation 38–3 and equation 38–1, thereby causing the B10 signal to become logic 1 and the B10BAR signal to become logic 0.

The third time counter 12 becomes full, a third logic 1 B9SET signal is provided. The third B9SET logic 1 signal does not cause a logic 0 B9RST signal, since the B10BAR signal is now logic 0. However, it does set B9 Latch 36 according to the B9SET $\overline{B9}$ term of equation 36–1.

At this time counter 12 can begin counting up again. When it reaches a full count, for the fourth time, counter means 10 will have reached a count of 1023. It should be apparent that any number of additional latch circuits may be coupled into counter means 10 in a similar manner, thereby increasing the counting capacity to any desired value. Further a simple gate circuit may be added to provide the RESET signal whenever the B9, B10 and B9SET signals are all logic 1 to clear counter means to zero.

What is claimed is:

1. A cyclically operating N+1 stage counter capable of changing its count during any given cycle of operation, each cycle of operation being divided into N bit times, said counter comprising:

an N stage shift register means operating in a continual shift manner so that whenever any signal representating one or another binary number is applied to the first stage thereof, a corresponding signal representating the same binary number is successively provided from each stage thereof during the next N successive bit times, said shift register registering a count during a given bit time of each cycle by each stage thereof providing a signal representing one or another of said binary numbers during said given bit time;

coupling means, including logic means, for coupling the output of said Nth stage to the input of said first stage, said logic means, on command, modifying the signal provided by said Nth stage so that the count registered by said shift register during said given bit time of the next occurring cycle is different from the count registered during said given bit time of the then occurring cycle;

decoding means responsive to the signal provided by said Nth stage for providing a signal whenever the Nth stage signal indicates the count registered by said shift register during the then occurring cycle is a certain count; and bistable means responsive to said decoding means signal for being set upon the occurrence of said decoding means signal.

2. The invention according to claim 1 wherein said certain count is $(2^N-1)$

3. The invention according to claim 2 wherein said decoding means includes latching means for becoming set at said given time of each cycle of operation and for being reset by the first Nth stage signal representing said another binary number.

4. The invention according to claim 3 wherein said decoding means signal is provided during said given time so long as said latching means included in said decoding means remains set one bit time prior to said given time.

5. A cyclically operating N+1 stage counter capable of changing its count during any given cycle of operation, each cycle of operation being divided into N bit times, said counter comprising:

an N stage shift register means operating in a continual shift manner so that whenever any signal representing one or another binary number is applied to the first stage thereof, a corresponding signal representing the same binary number is successively provided from each stage thereof during the next N successive bit times, said shift register registering a count during a given bit time of each cycle by each stage thereof providing a signal representing one or another of said binary numbers during said given bit time;

coupling means, including logic means, for coupling the output of the Nth stage to the input of said first stage, said logic means, on command, modifying the signal provided by said Nth stage so that the count registered by said shift register during said given bit time of the next occurring cycle is different from the count registered during said given bit time of the then occurring cycle;

decoding means responsive to the signal provided by said Nth stage for providing a signal whenever the Nth stage signal indicates the count registered by said shift register means during the then occurring cycle is a certain count; and bistable means responsive to said decoding means signal for being set upon the occurrence of said decoding means signal;

wherein said certain count is $(2^N-1)$;

wherein said decoding means includes means for becoming set at said given time of each cycle of operation and for being reset by the first Nth stage signal representing said another binary number;

wherein said decoding means signal is provided during said given time so long as said means included in said decoding means remains set one bit time prior to said time; and wherein each of said shift register means, logic means, and decoding means includes metal oxide semiconductor transistors connected to operate in a four-phase circuit configuration manner.

6. The invention according to claim 5 wherein said decoding means signal is provided during said given time so long as said means included in said decoding means is set one bit time prior to said given time and the then occurring Nth stage signal represents said one binary number.

7. The invention according to claim 6 wherein said one binary number is one and said another binary number is zero.

* * * * *